US012707157B2

(12) United States Patent
Majee et al.

(10) Patent No.: US 12,707,157 B2
(45) Date of Patent: Aug. 11, 2026

(54) TONE CONSISTENCY FOR CAMERA IMAGING

(71) Applicant: Samsung Electronics Co., Ltd., Suwon-si (KR)

(72) Inventors: Soumendu Majee, McKinney, TX (US); Pavan C. Madhusudanarao, The Colony, TX (US); Zeeshan Nadir, Allen, TX (US); John Seokjun Lee, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 18/952,715

(22) Filed: Nov. 19, 2024

(65) Prior Publication Data

US 2025/0234100 A1 Jul. 17, 2025

Related U.S. Application Data

(60) Provisional application No. 63/621,289, filed on Jan. 16, 2024.

(51) Int. Cl.
*H04N 23/86* (2023.01)

(52) U.S. Cl.
CPC .................................. *H04N 23/86* (2023.01)

(58) Field of Classification Search
CPC ..................................................... H04N 23/86
See application file for complete search history.

(56) References Cited

U.S. PATENT DOCUMENTS 10,805,649 B2 10/2020 Pekkucuksen et al.
11,128,809 B2 * 9/2021 Zhen ........................ G06T 7/32
(Continued)

FOREIGN PATENT DOCUMENTS

CN 113379620 A 9/2021
CN 112422838 B 3/2022
(Continued)

OTHER PUBLICATIONS

International Search Report and Written Opinion of the International Searching Authority dated Apr. 14, 2025, in connection with International Application No. PCT/KR2024/021407, 7 pages.
(Continued)

*Primary Examiner* — Shahbaz Nazrul

(57) ABSTRACT

A method includes obtaining a single frame image from a multi-frame processing pipeline and obtaining a hardware image signal processing (HWISP) reference image. The method also includes obtaining luma components of the HWISP reference image and luma components of the single frame image. The method further includes generating a gain curve based on data distributions of the luma components of the HWISP reference image and the single frame image and applying respective gains to the luma components of the single frame image to obtain modified luma components. In addition, the method includes obtaining chroma components of the single frame image, applying a saturation gain to the chroma components of the single frame image based on the gain curve and the luma components of the single frame image to obtain modified chroma components, and combining the modified luma components and the modified chroma components to generate a final image.

20 Claims, 11 Drawing Sheets

(56) References Cited

U.S. PATENT DOCUMENTS

| | | | | |
|---|---|---|---|---|
| 11,388,348 | B2 * | 7/2022 | Le | G06T 3/4015 |
| 11,477,383 | B2 | 10/2022 | Park et al. | |
| 2018/0082454 | A1 | 3/2018 | Sahu et al. | |
| 2018/0226032 | A1 * | 8/2018 | Kim | G09G 3/3406 |
| 2019/0281215 | A1 * | 9/2019 | Chan | H04N 11/20 |
| 2023/0052082 | A1 | 2/2023 | Pekkucuksen et al. | |
| 2024/0054624 | A1 | 2/2024 | Bogdanowicz et al. | |
| 2024/0087275 | A1 | 3/2024 | Taieb et al. | |
| 2024/0187616 | A1 * | 6/2024 | Touze | H04N 19/186 |

FOREIGN PATENT DOCUMENTS

| | | | |
|---|---|---|---|
| CN | 112188095 | B | 5/2022 |
| JP | 2013055712 | A | 3/2013 |
| KR | 20200052598 | A | 5/2020 |
| WO | 2024035223 | A1 | 2/2024 |

OTHER PUBLICATIONS

Peter, “Google explains how the Live HDR+ feature on the Pixel 4 and 4a works,” Gsmarena, Aug. 2020, 3 pages.

Di Gesu, “An Overview of Pyramid Machines for Image Processing,” Second International Conference on Advances in Pattern Recognition and Digital Techniques, Indian Statistical Institute, Calcutta, India, Jan. 6-9, 1986, 23 pages.

Gonzalez, et al., “Digital Image Processing (3rd Edition),” Pearson, Aug. 31, 2007, p. 128.

Long, et al., “Fully convolutional networks for semantic segmentation,” 2015 IEEE Conference on Computer Vision and Pattern Recognition (CVPR), Boston, Massachusets, Jun. 7-12, 2015, pp. 3431-3440.

He, et al., “Mask R-CNN,” 2017 IEEE International Conference on Computer Vision (ICCV), Venice, Italy, Oct. 22-29, 2017, pp. 2961-2969.

* cited by examiner

TONE CONSISTENCY FOR CAMERA IMAGING

CROSS-REFERENCE TO RELATED APPLICATION AND PRIORITY CLAIM

This application claims priority under 35 U.S.C. § 119 (e) to U.S. Provisional Patent Application No. 63/621,289 filed on Jan. 16, 2024, which is hereby incorporated by reference in its entirety.

TECHNICAL FIELD

This disclosure relates generally to imaging systems. More specifically, this disclosure relates to tone consistency for camera imaging.

BACKGROUND

In camera imaging pipelines, when a user attempts to image a scene, the final captured image of the scene is often different from a preview image shown when a capture button was pressed. One reason for this is because the preview image is typically generated by a hardware image signal processor pipeline using a single frame capture. Conversely, the final image is typically generated by a multi-frame pipeline using multiple frames. The discrepancy between the preview image presented to the user prior to image capture and the final output image can lead to user dissatisfaction with the final output image because the final output image may not be what the user was expecting to obtain based on the preview image.

SUMMARY

This disclosure relates to tone consistency for camera imaging.

In a first embodiment, a method includes obtaining a single frame image from a multi-frame processing pipeline. The method also includes obtaining a hardware image signal processing (HWISP) reference image. The method further includes obtaining luma components of the HWISP reference image and luma components of the single frame image. The method also includes generating a gain curve based on data distributions of the luma components of the HWISP reference image and the luma components of the single frame image. The method further includes applying respective gains to the luma components of the single frame image based on the gain curve to obtain modified luma components. The method also includes obtaining chroma components of the single frame image. The method further includes applying a saturation gain to the chroma components of the single frame image based on the gain curve and the luma components of the single frame image to obtain modified chroma components. In addition, the method includes combining the modified luma components and the modified chroma components to generate a final image.

In a second embodiment, an electronic device includes at least one processing device configured to obtain a single frame image from a multi-frame processing pipeline. The at least one processing device is also configured to obtain an HWISP reference image. The at least one processing device is further configured to obtain luma components of the HWISP reference image and luma components of the single frame image. The at least one processing device is also configured to generate a gain curve based on data distributions of the luma components of the HWISP reference image and the luma components of the single frame image. The at least one processing device is further configured to apply respective gains to the luma components of the single frame image based on the gain curve to obtain modified luma components. The at least one processing device is also configured to obtain chroma components of the single frame image. The at least one processing device is further configured to apply a saturation gain to the chroma components of the single frame image based on the gain curve and the luma components of the single frame image to obtain modified chroma components. In addition, the at least one processing device is configured to combine the modified luma components and the modified chroma components to generate a final image.

In a third embodiment, a non-transitory machine readable medium includes instructions that when executed cause at least one processor of an electronic device to obtain a single frame image from a multi-frame processing pipeline. The non-transitory machine readable medium also includes instructions that when executed cause the at least one processor to obtain an HWISP reference image. The non-transitory machine readable medium further includes instructions that when executed cause the at least one processor to obtain luma components of the HWISP reference image and luma components of the single frame image. The non-transitory machine readable medium also includes instructions that when executed cause the at least one processor to generate a gain curve based on data distributions of the luma components of the HWISP reference image and the luma components of the single frame image. The non-transitory machine readable medium further includes instructions that when executed cause the at least one processor to apply respective gains to the luma components of the single frame image based on the gain curve to obtain modified luma components. The non-transitory machine readable medium also includes instructions that when executed cause the at least one processor to obtain chroma components of the single frame image. The non-transitory machine readable medium further includes instructions that when executed cause the at least one processor to apply a saturation gain to the chroma components of the single frame image based on the gain curve and the luma components of the single frame image to obtain modified chroma components. In addition, the non-transitory machine readable medium includes instructions that when executed cause the at least one processor to combine the modified luma components and the modified chroma components to generate a final image.

Any one or any combination of the following features may be used with the first, second, or third embodiment. The data distributions of the luma components of the HWISP reference image and the luma components of the single frame image may include a first histogram of the luma components of the HWISP reference image and a second histogram of the luma components of the single frame image. The gain curve may be generated by performing histogram matching on the first histogram and the second histogram. A refined gain curve may be generated based on the gain curve and information indicative of an over-exposedness of the HWISP reference image. The respective gains may be applied to the luma components of the single frame image and the saturation gain may be applied to the chroma components of the single frame image based on the refined gain curve. The information indicative of the over-exposedness of the HWISP reference image may include an over-exposedness metric obtained based on a cumulative distribution function of the luma components of the HWISP reference image. The refined gain curve may be generated by computing fitting weights using the information indicative of the over-exposedness of the HWISP reference image and refining the gain curve using the fitting weights and by minimizing a cost function. Consistency masks may be generated based on the luma components of the HWISP reference image and the luma components of the single frame image, regions of the HWISP reference image and the single frame image to be removed from use in generating the data distributions may be determined based on the consistency masks, and the determined regions of the HWISP reference image and the single frame image may be removed. The respective gains may be applied to the luma components of the single frame image by performing a blending of intensity values. The consistency masks may be one or more of pixel-saturation maps used to identify the determined regions for removal based on pixel-saturation levels of the determined regions, deghosting maps used to identify the determined regions for removal based on movement in the determined regions, or segmentation maps used to identify the determined regions for removal based on a detected regions of interest in the HWISP reference image and the single frame image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
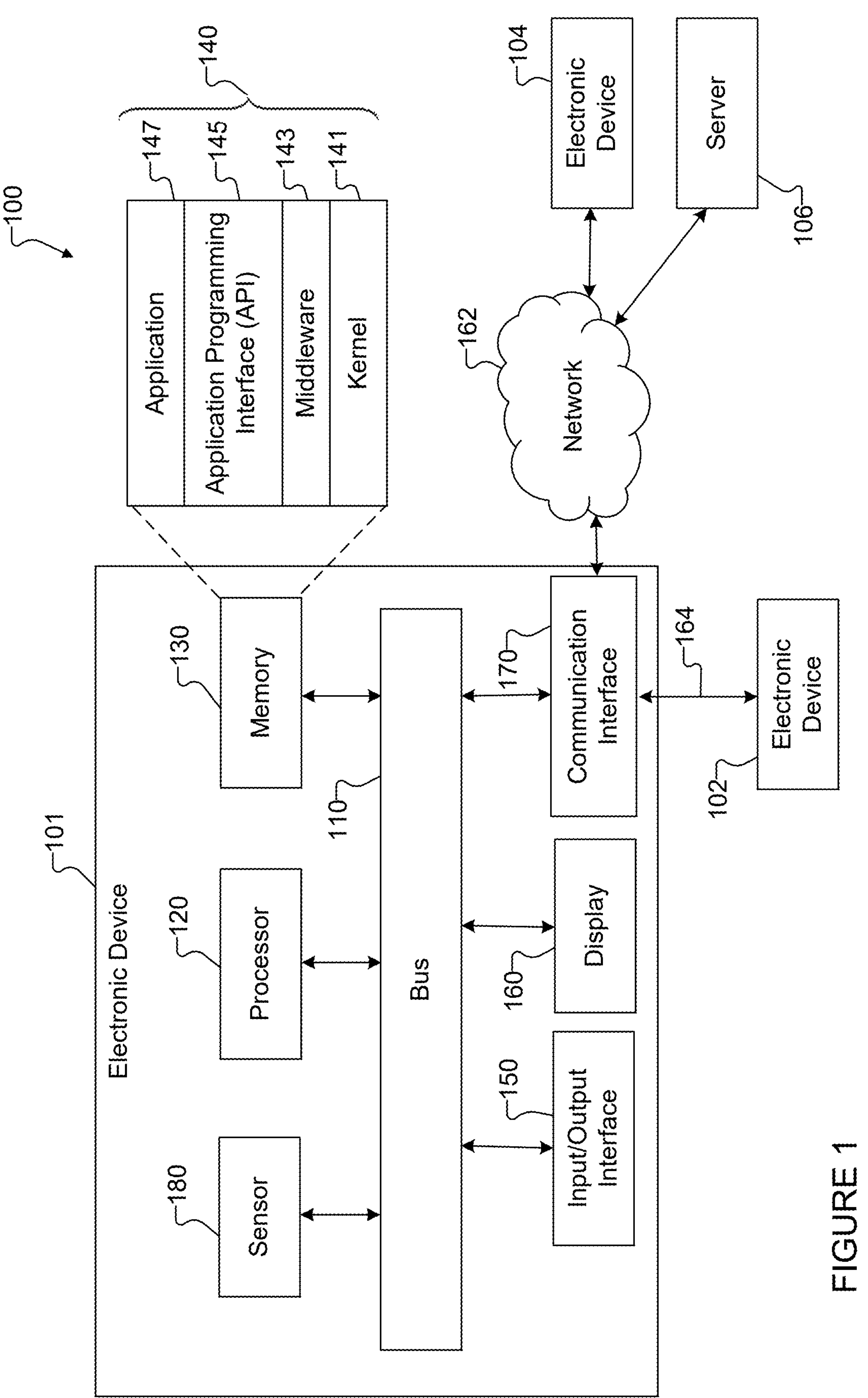
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, in camera imaging pipelines, when a user attempts to image a scene, the final captured image of the scene is often different from a preview image shown when a capture button was pressed. One reason for this is because the preview image is typically generated by a hardware image signal processor pipeline using a single frame capture. Conversely, the final image is typically generated by a multi-frame pipeline using multiple frames. The discrepancy between the preview image presented to the user prior to image capture and the final output image can lead to user dissatisfaction with the final output image because the final output image may not be what the user was expecting to obtain based on the preview image.

It can be challenging to tune a multi-frame image tone to match a hardware image signal processor (HWISP) image tone since these pipelines use different inputs, such as multi-exposure vs. single-exposure HWISP, and different processes. Automatically adjusting the final tone to match a preview image's tone using conventional methods can lead to high dynamic range (HDR) loss in bright regions since the preview image is typically obtained from a single exposure and thus is not an HDR image.

To address these or other issues, various embodiments of this disclosure provide for performing a tone consistency operation on a multi-frame output image by using a preview image as a reference image, where the reference image can be captured using an HWISP of the electronic device. This disclosure thus provides for a camera pipeline system utilizing a camera preview frame and single frame result from the multi-frame pipeline as inputs to match the overall tone of the preview frame to the single frame result from the multi-frame pipeline.

In various embodiments of this disclosure, the tone consistency operation can include a process that matches the overall tone of the single frame result from the multi-frame pipeline with the tone of a reference image. This can include computing a score for HDR loss in the reference image and using the score to reduce matching weights for bright regions to limit HDR loss after tone-matching, computing fitting weights based on the score for HDR loss, regularizing a gain curve to limit sharp transitions and minimizing a cost function using the fitting weights for different brightness levels to obtain a parametric tone curve that matches the tone, and applying the gain of the gain curve to luma components of the input image. This process can also include increasing color saturation in the chroma channel of the input image by multiplying both Cb and Cr (also referred to U and V channels, respectively) using a multiplier determined by luma tone-matching gains to address perceived desaturation due to brightening of the image as a result of the process.

In various embodiments of this disclosure, the tone consistency operation can include a process that matches both local and global tones of the single frame result from the multi-frame pipeline to a reference image. This can include minimizing an objective to match different brightness levels across different regions of the image and obtaining a parametric tone curve to match the tone of reference, calculating a consistency mask to determine the regions which are to be used in tone matching, applying the computed tone curve to obtain an image which is tone consistent with the reference image, and using blending (such as pyramid blending) to blend intensity values to avoid sharp transitions as well as to preserve HDR features of the input image. In various embodiments, the consistency mask is a binary mask and can be customized to avoid outlier regions such as saturated areas, motion areas, etc. In some embodiments, the consistency mask can be one of a saturation map, a deghosting map, or a segmentation map.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to tone consistency for camera imaging.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to tone consistency for camera imaging. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to tone consistency for camera imaging.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
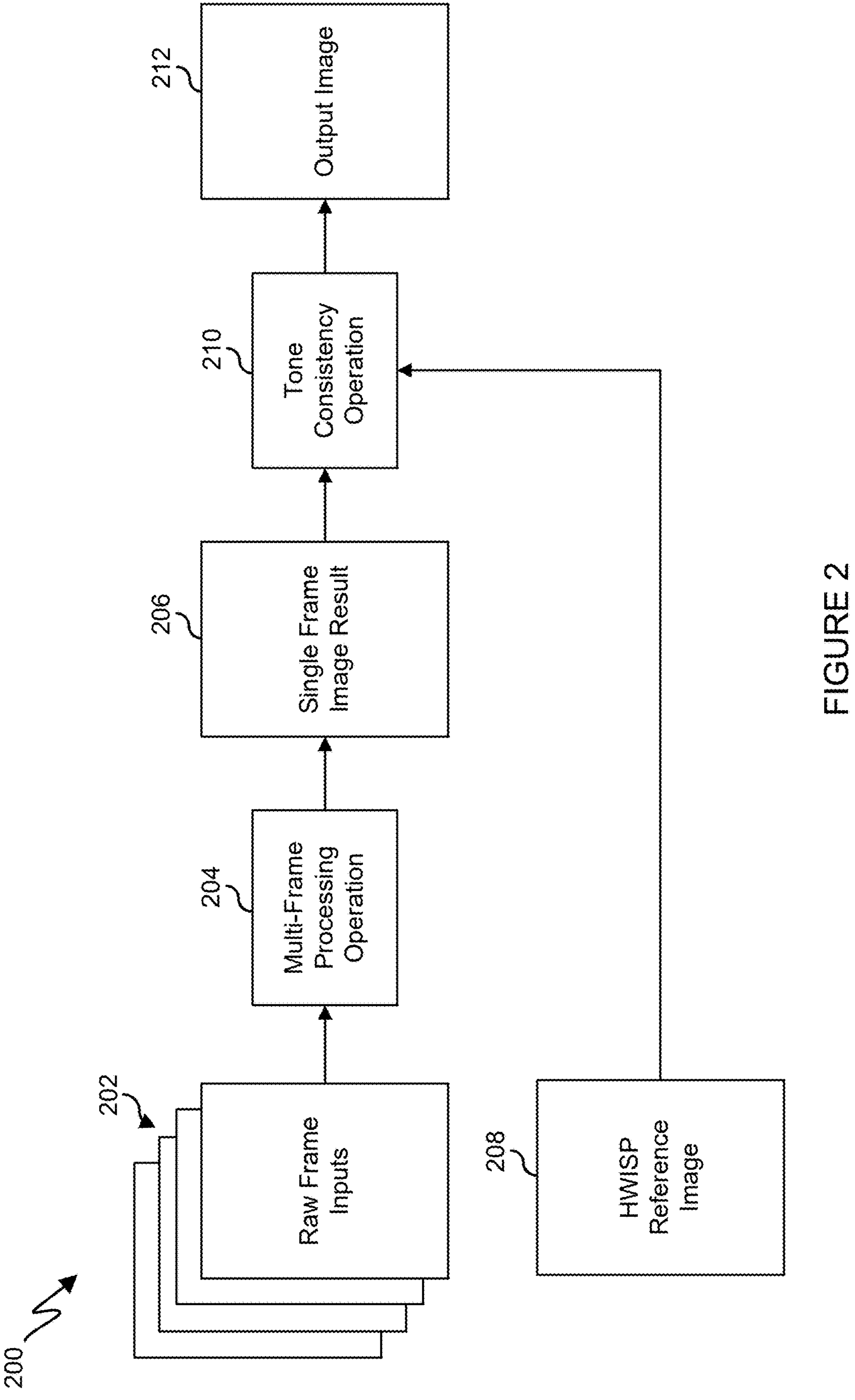
FIG. 2 illustrates an example image tone consistency process in accordance with this disclosure.

FIG. 2 illustrates an example image tone consistency process 200 in accordance with this disclosure. For ease of explanation, the process 200 is described as involving the use of the electronic device 101 in the network configuration 100 of FIG. 1. However, the process 200 may be used with any other suitable electronic device (such as the server 106) or a combination of devices (such as the electronic device 101 and the server 106) and in any other suitable system(s).

As shown in FIG. 2, raw frame inputs 202 are obtained, which in some cases can be a multi-frame input obtained by capturing multiple image frames of a scene or environment using one or more cameras or imaging sensors of an electronic device, such as one or more imaging sensors 180 of the electronic device 101. The raw frame inputs 202 are used by a multi-frame processing operation 204 to obtain a single frame image result 206. A hardware image signal processor (HWISP) reference image 208 is also obtained. As discussed above, the HWISP reference image 208 can be a single image obtained using a single image pipeline that uses the HWISP, such as the single frame pipeline used to present preview images to the user prior to capturing an image by the user. The process 200 uses the HWISP reference image 208 to provide an example of characteristics to be used in performing tone consistency in the multi-frame pipeline such that the final output image more closely matches the HWISP reference image 208.

The single frame image result 206 and the HWISP reference image 208 are used by a tone consistency operation 210 to adjust the tone of the single frame image result 206 based on the tone characteristics of the HWISP reference image 208. The tone consistency operation 210 outputs an output image 212 that represents the adjusted image. Adjusting the tone of the single frame image result 206 in this way thus provides a final output image 212 that matches the overall tone of the single frame image result 206 with the overall tone of the HWISP reference image 208 (such as the preview frame).

Although FIG. 2 illustrates one example of a tone consistency process 200, various changes may be made to FIG. 2. For example, various components and functions in FIG. 2 may be combined, further subdivided, replicated, or rearranged according to particular needs. Also, one or more additional components and functions may be included if needed or desired.

Figure 3:
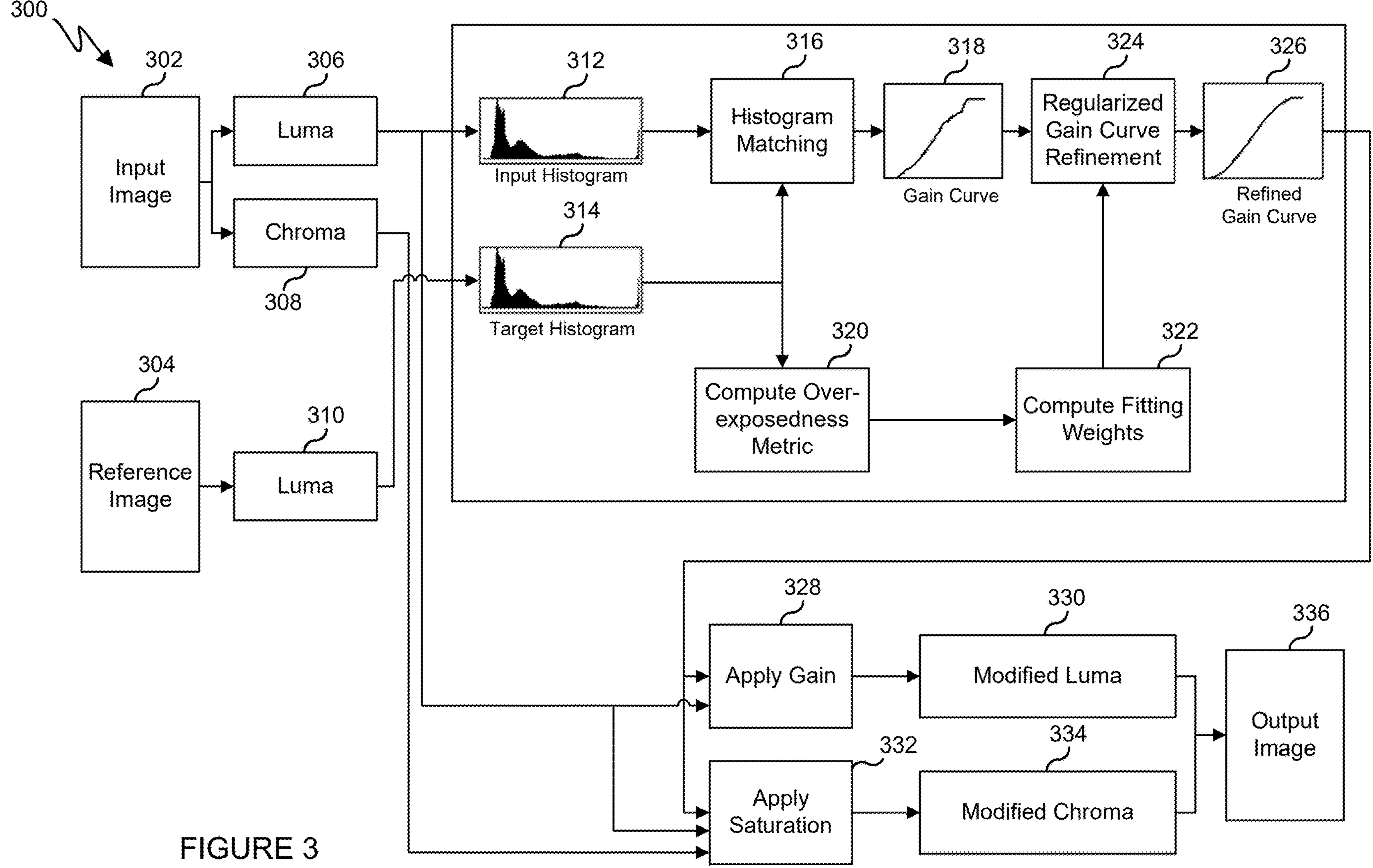
FIG. 3 illustrates an example tone consistency process in accordance with this disclosure.

FIG. 3 illustrates an example tone consistency process 300 in accordance with this disclosure. For ease of explanation, the process 300 is described as involving the use of the electronic device 101 in the network configuration 100 of FIG. 1. However, the process 300 may be used with any other suitable electronic device (such as the server 106) or a combination of devices (such as the electronic device 101 and the server 106) and in any other suitable system(s).

As shown in FIG. 3, an input image 302 and a reference image 304 are provided. The input image 302 can be a single frame image result obtained using a multi-frame imaging pipeline of the electronic device 101, such as the single frame image result 206. The reference image 304 can be a single frame image obtained using a single frame imaging pipeline of the electronic device 101, such as the HWISP reference image 208. As described in this disclosure, the reference image 304 can correspond to a preview image presented on a screen of the electronic device 101 prior to image capture.

As also shown in FIG. 3, luma components 306 and chroma components 308 are retrieved or obtained from the input image 302. Luma components 310 of the reference image 304 are also retrieved or obtained. Using the luma components 306 of the input image 302, an input histogram 312 is created. A target histogram 314 is also created using the luma components 310 of the reference image 304. In various embodiments, the input histogram 312 and the target histogram 314 are data distributions of the luma components and provide a visual representation of the distribution of the luma components' data. In some embodiments, the histograms 312, 314 can be constructed by binning a range of values, dividing the entire range of values into a series of intervals, and counting how many values fall into each interval. However, any other method of creating the input histogram 312 and the target histogram 314 may be performed.

The process 300 also includes performing a histogram matching operation 316 using the input histogram 312 and the target histogram 314 to generate a gain curve 318. In various embodiments, the histogram matching operation 316 serves to calibrate the input image 302 to match the reference image 304 by creating the gain curve 318 as a visual representation of the multiplicative factor (indicated on the y-axis of the gain curve) that is applied to each pixel value of the input image 302 (indicated on the x-axis of the gain curve) so that the input histogram 312 matches the target histogram 314.

An over-exposedness metric computation operation 320 is also performed based on the target histogram 314 to compute an over-exposedness metric, such as a score for HDR loss in the reference image 304. The over-exposedness metric can be used, for example, to reduce matching weights for bright image regions to limit HDR loss after tone-matching is performed. That is, using the over-exposedness metric, a fitting weights computation operation 322 can be performed to generate new weights that may be used to refine the gain curve 318 in order to limit sharp transitions in the gain curve 318.

In various embodiments, the over-exposed metric measures a score of how saturated or over-exposed the reference image 304 is. The over-exposedness metric may be gauged by the fraction of the image with saturated/close-to-saturated values. The over-exposedness metric can be useful because some parts of the reference image 304 may be over-exposed, and propagation of this overexposure to the final image that is presented to the user can be avoided by using the over-exposedness metric to perform a regularized gain curve refinement operation 324 on the gain curve 318. For instance, in various embodiments, the over-exposed metric m can be computed based on a cumulative distribution function (CDF) of F (i), i=0, . . . , 255 of the target histogram 314. In some cases, this can be represented as follows.

$$m = \frac{1}{1 + e^{-v1*(1-F(k_1)-v2)}}$$

Here, v1 and v2 are tunable parameters, and index $0<k_1<255$. In some examples, v1>1 and 0<v2<1.

Given the over-exposedness metric m, the fitting weights computation operation 322 can be used to generate new weights $\lambda=[\lambda_0, \lambda_1, \ldots, \lambda_{255}]^T$, which in some cases can be represented as follows.

$$\lambda_i = m*\left(\sin\left(\frac{\pi}{2}*\frac{i-k_2}{256-k_2}\right)\right)^2, \text{ for } i = 128, \ldots, 255$$

$$\lambda_i = 0, \text{ for } i = 0, \ldots, 128$$

Using the new weights, the regularized gain curve refinement operation 324 can be performed on the gain curve 318 to generate a refined gain curve 326. This can limit sharp transitions in the gain curve 318 and reduce or minimize a cost function that involves fitting weights for different brightness levels to obtain the refined gain curve 326 as a parametric tone curve for matching the tone based on the reference image 304. For instance, given initial gain curve values $y=[y_0, y_1, \ldots, y_{M-1}]^T$, at M equi-spaced points $x=[x_0, x_1, \ldots, x_{M-1}]^T$, a polynomial basis matrix can be defined as follows.

$$H = \begin{bmatrix} 1 & x_0 & \ldots & x_0^N \\ \vdots & x_1 & \ldots & \vdots \\ 1 & x_{M-1} & \ldots & x_{M-1}^N \end{bmatrix}$$

Here, a basis vector can be defined as $a=[a_0, a_1, \ldots, a_N]^T$, and M=256. In some cases, the regularized tone-curve refinement can be obtained by minimizing the cost function, which can be represented as follows.

$$a^* = \underset{a}{\operatorname{argmin}}\{\|y - Ha\|_{1-\lambda}^2 + \|x - Ha\|_{\lambda}^2\}$$

Here, $$\|z\|_w^2 = z^T \operatorname{diag}(w) z,$$

the solution can be computed in closed form, and the final tone curve can be given by b=Ha*.

As shown in FIG. 3, using the refined gain curve 326, a gain application operation 328 can be applied to the luma components 306 of the input image 302 to obtain modified luma values 330. For example, given the refined gain curve 326 (*b*) and a luma image (Y) (the luma components 306 of the input image 302), the luma image (Y) can be updated as follows.

$$Y'[i] = b[Y[i]] * Y[i]$$

Here, i is each pixel location and each original luma value Y[i] follows $0 \leq Y[i] < 256$.

In some cases, modifying just the luma values can cause brightening of the image, which can cause a user to perceive the image as desaturated in comparison to the reference image. To address this issue, a saturation application operation 332 can also be performed to obtain modified chroma values 334 in order to increase color saturation in the chroma channel by multiplying both Cb and Cr (also referred to U and V channels, respectively) using a multiplier determined by luma tone-matching. For example, given the refined gain curve 326 (*b*), the luma image (Y), and a chroma image (U,V) (the chroma components 308 of the input image 302), a regularized pixelwise gain can be determined, which can be represented as follows.

$$G[i] = g_1 + (g_2 - g_1) * \min(1, Y'[i]/(Y[i] + \epsilon))$$

Here, $\epsilon$, $g_1$, and $g_2$ are tunable parameters. In some examples, $g_1$ is about 1 (such as within +/−5%) and $g_2 > g_1$. To obtain the modified chroma values 334, the regularized pixelwise gain can be used to update the chroma values of the chroma components 308, such as in the following manner.

$$U'[i] = \operatorname{round}(U[i] * G[i])$$

$$V'[i] = \operatorname{round}(V[i] * G[i])$$

Here, round( ) rounds off to the nearest integer.

It will be understood that, if a color space other than YUV is used, similar operations can be performed to obtain the modified chroma values 334. For example, for the HSV color space, saturation values can be multiplied by G[i] to achieve the same effect as described above. Based on the modified luma values 330 and the modified chroma values 334, a final output image 336 can be generated that includes the HDR image characteristics of the input image 302, such as resolution, sharpness, etc., while more closely matching the reference image 304 in tone.

Although FIG. 3 illustrates one example of a tone consistency process 300, various changes may be made to FIG. 3. For example, various components and functions in FIG. 3 may be combined, further subdivided, replicated, or rearranged according to particular needs. Also, one or more additional components and functions may be included if needed or desired.

Figure 4:
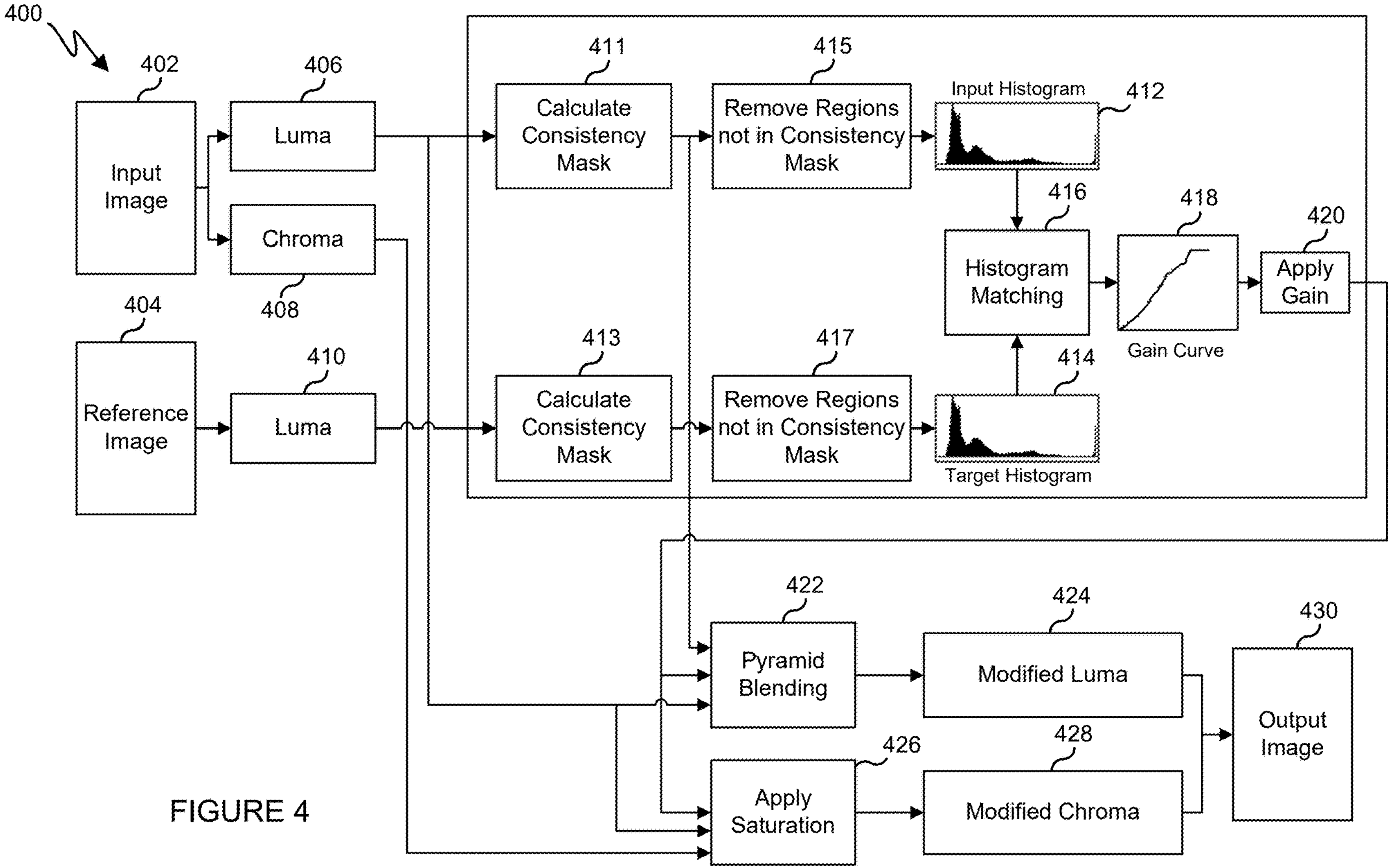
FIG. 4 illustrates an example tone consistency process using a consistency mask in accordance with this disclosure.

FIG. 4 illustrates an example tone consistency process 400 using a consistency mask in accordance with this disclosure. For ease of explanation, the process 400 is described as involving the use of the electronic device 101 in the network configuration 100 of FIG. 1. However, the process 400 may be used with any other suitable electronic device (such as the server 106) or a combination of devices (such as the electronic device 101 and the server 106) and in any other suitable system(s).

The process 400 involves both local and global tone consistency approaches that match both local and global tones of a given reference image. As shown in FIG. 4, an input image 402 and a reference image 404 are provided. The input image 402 can be a single frame image result obtained using a multi-frame imaging pipeline of the electronic device 101, such as the single frame image result 206. The reference image 404 can be a single frame image obtained using a single frame imaging pipeline of the electronic device 101, such as the HWISP reference image 208. As described in this disclosure, the reference image 404 can correspond to a preview image presented on a screen of the electronic device 101 prior to image capture.

As also shown in FIG. 4, luma components 406 and chroma components 408 are retrieved or obtained from the input image 402. Luma components 410 of the reference image 404 are also retrieved or obtained. The process 400 includes minimizing an objective to match different brightness levels across different regions of the image and obtain a parametric tone curve to match the tone of the reference image 404. A first consistency mask calculation operation 411 is used to generate a first consistency mask based on the luma components 406 of the input image 402. A second consistency mask calculation operation 413 is used to generate a second consistency mask based on the luma components 410 of the reference image 404. The consistency masks are used to determine which regions in the images to use in the tone matching provided by the process 400. In various embodiments, the consistency masks can each be a binary mask and can be customized to avoid outlier regions such as saturated areas, motion areas, etc.

As further shown in FIG. 4, the first consistency mask generated by the first consistency mask calculation operation 411 is used by a first region removal operation 415 to remove regions in the image that are not in the first consistency mask in order to create an input histogram 412 that excludes the data removed by the first region removal operation 415. Likewise, the second consistency mask generated by the second consistency mask calculation operation 413 is used by a second region removal operation 417 to remove regions in the image that are not in the second consistency mask in order to create a target histogram 414 that excludes the data removed by the second region removal operation 417. A histogram matching operation 416 can be performed using the input histogram 412 and the target histogram 414 to generate a gain curve 418. The histogram matching operation 416 can be the same or similar to the histogram matching operation 316 described with respect to FIG. 3.

A gain application operation 420, which can be the same as or similar to the gain application operation 328, can be performed so that the gain of the computed tone curve provided by the gain curve 418 is applied to the luma components 406 of the input image 402 to create a look-up table (LUT) applied image. A blending operation, such as a pyramid blending operation 422, can use the luma components 407 and the luma components of the LUT applied image generated by the gain application operation 420. For example, the pyramid blending operation 422 may blend intensity values to avoid sharp transitions, as well as to preserve HDR characteristics of the input image 402.

Figure 5:
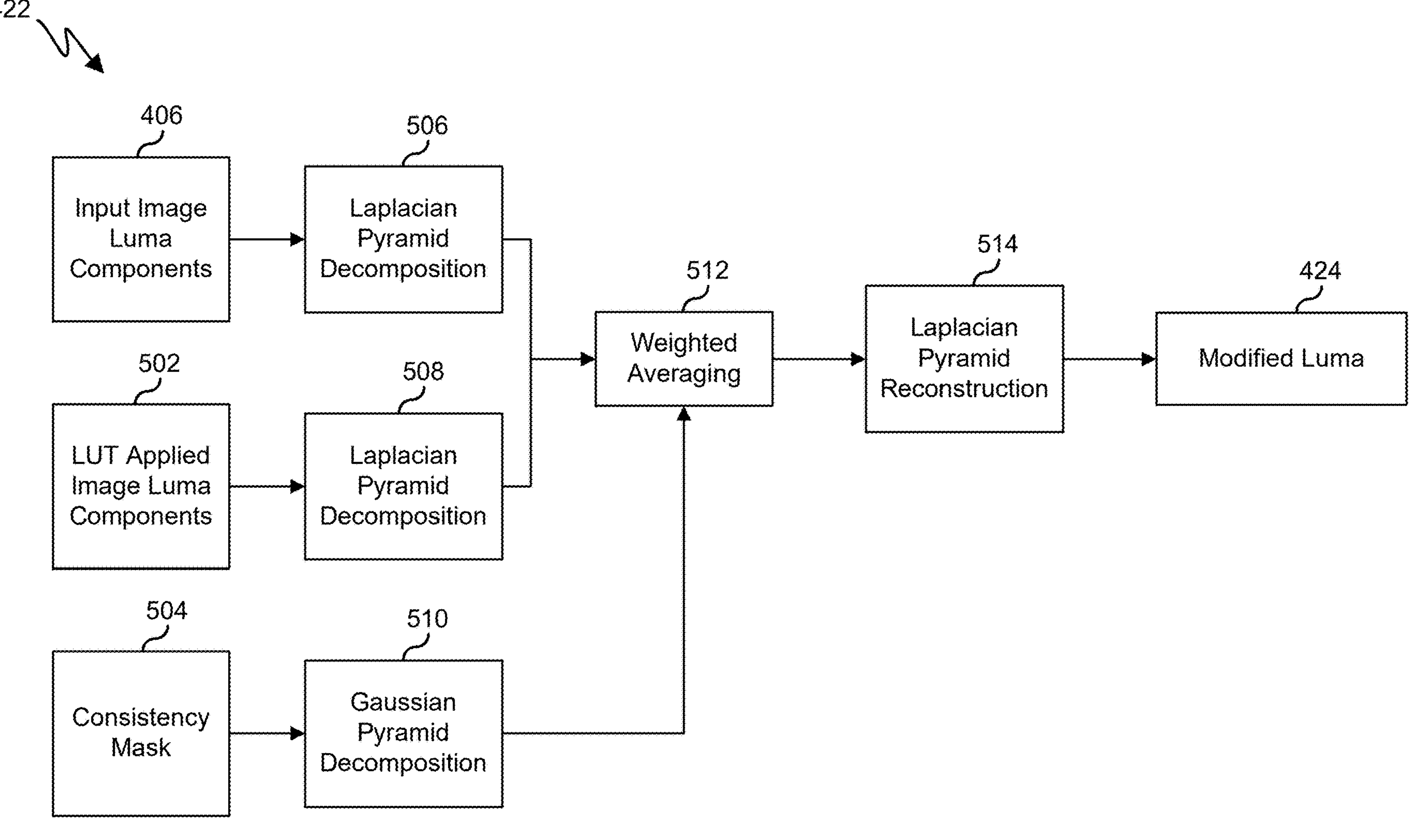
FIG. 5 illustrates an example of a pyramid blending operation in accordance with this disclosure.

As an example of this, FIG. 5 illustrates an example of the pyramid blending operation 422 in accordance with this disclosure. For ease of explanation, the operation 422 is described as involving the use of the electronic device 101 in the network configuration 100 of FIG. 1. However, the operation 422 may be used with any other suitable electronic device (such as the server 106) or a combination of devices (such as the electronic device 101 and the server 106) and in any other suitable system(s).

As shown in FIG. 5, the luma components 406 from the input image 402, luma components 502 from a LUT applied image created via the gain application operation 420, and a consistency mask 504 are supplied as inputs to the pyramid blending operation 422. The luma components 406 and the luma components 502 are subjected to first and second Laplacian pyramid decomposition operations 506, 508, respectively. The Laplacian pyramid decomposition operations 506, 508 can be multiscale decomposition operations that use a Laplacian pyramid. The consistency mask 504 is subjected to a Gaussian pyramid decomposition operation 510. The decomposition operations 506, 508, 510 may represent operations such as those described in Di Gesù et al., "An overview of pyramid machines for image processing," Inf. Sci. 47, No. 1, 1989, pg. 17-34 (which is here incorporated by reference in its entirety). At each level of the pyramid, a weighted average 512 of the luma components 406 and the luma components 502 can be calculated using the decomposed consistency mask as weights. Using the weighted average 512, a Laplacian pyramid reconstruction operation 514 can be performed to obtain the final blended output, which here represents a modified luma 424.

Referring again to FIG. 4, the gain can also be applied to the chroma components 408 of the input image 402, such as that described with respect to the saturation application operation 332 of FIG. 3, to obtain modified chroma 428. Using the modified luma 424 and the modified chroma 428, an output image 430 can be obtained that is tone-consistent with the reference image 404.

Although FIG. 4 illustrates one example of a tone consistency process 400 using a consistency mask, various changes may be made to FIG. 4. For example, various components and functions in FIG. 4 may be combined, further subdivided, replicated, or rearranged according to particular needs. Also, one or more additional components and functions may be included if needed or desired. Although FIG. 5 illustrates one example of a pyramid blending operation 422, various changes may be made to FIG. 5. For instance, various components and functions in FIG. 5 may be combined, further subdivided, replicated, or rearranged according to particular needs. Also, one or more additional components and functions may be included if needed or desired.

Figure 6:
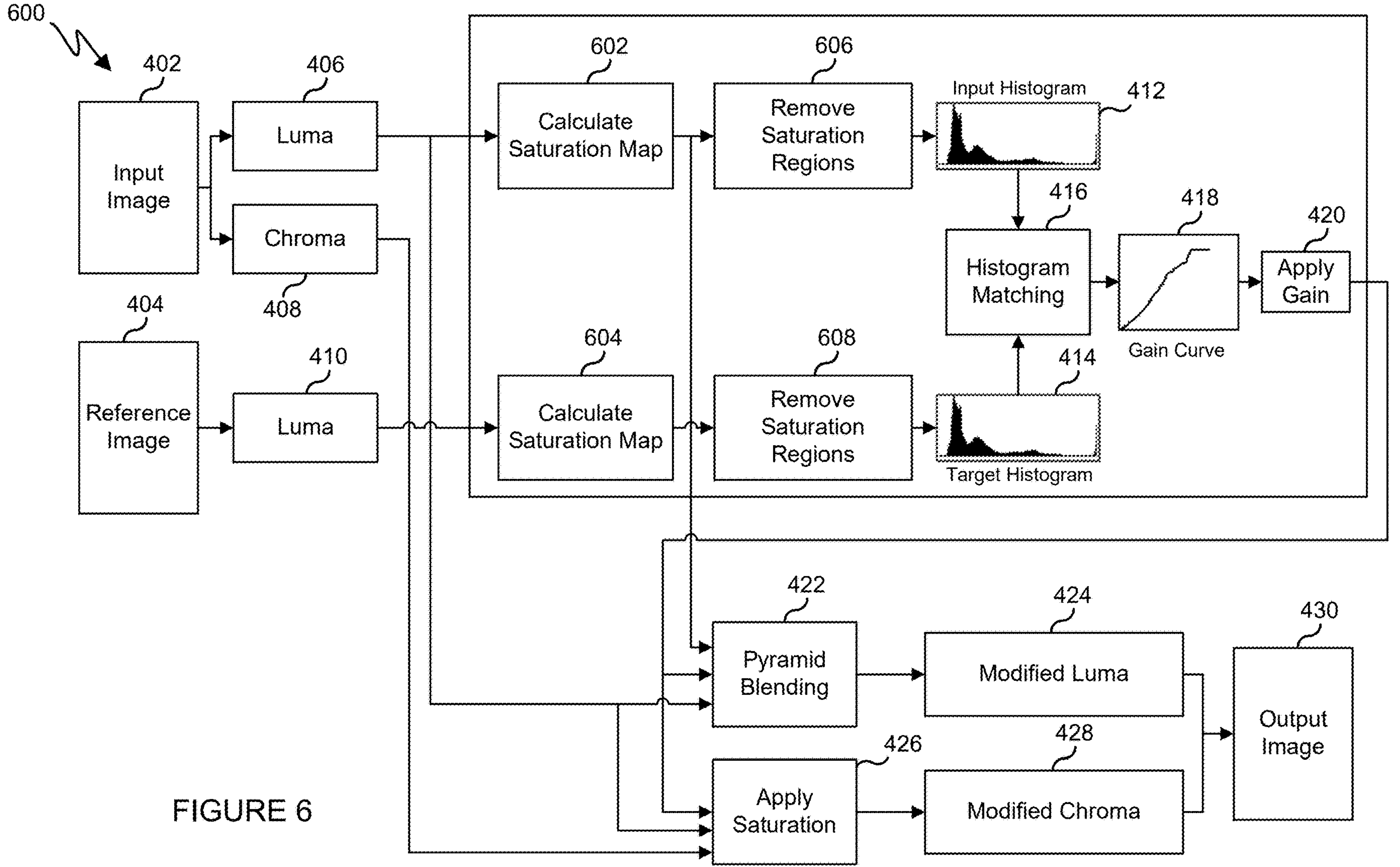
FIG. 6 illustrates an example tone consistency process using a saturation map in accordance with this disclosure.

In various embodiments, the consistency mask 504 can include one or more maps, such as a saturation map, a deghosting map, and/or a segmentation map. FIG. 6 illustrates an example tone consistency process 600 using a saturation map in accordance with this disclosure. For ease of explanation, the process 600 is described as involving the use of the electronic device 101 in the network configuration 100 of FIG. 1. However, the process 600 may be used with any other suitable electronic device (such as the server 106) or a combination of devices (such as the electronic device 101 and the server 106) and in any other suitable system(s).

As shown in FIG. 6, the process 600 is similar to the process 400 but, instead of performing operations 411, 413, 415, and 417, a first saturation map calculation operation 602, a second saturation map calculation operation 604, a first saturation regions removal operation 606, and a second saturation regions removal operation 608 are performed. Based on the removed saturation regions, the input histogram 412 and the target histogram 414 are generated, and the rest of the process 600 proceeds in a similar manner as the process 400 of FIG. 4.

In various embodiments, saturation maps can be used as the consistency mask. The saturation maps detect saturated regions, and subsequently these saturated regions can be removed when matching the tone. The first saturation map calculation operation 602 generates a first saturation map that is used by the first saturation regions removal operation 606 to remove saturated regions of the input image 402 and to output the input histogram 412. The second saturation map calculation operation 604 generates a second saturation map that is used by the second saturation regions removal operation 608 to remove saturated regions of the reference image 404 and to output the target histogram 414. In this way, since saturated areas are considered as outliers and should not be matched, they are removed before performing the histogram matching operation 416.

Camera pipelines can employ multi-frame processing where a burst of frames is captured successively when the camera button is pressed or image capture is otherwise initiated. This burst of frames is processed by multiple modules present in the pipeline to obtain the final image. The captured frames can contain a combination of short exposure and long exposure images. The motivation to employ this stack of frames is to reduce noise by improving signal to noise ratio as well as to increase the HDR component in the final image. The first and second saturation map calculation operations 602, 604 each generate a saturation map for the corresponding input image 402 or reference image 404, where each saturation map corresponds to a mask with values ranging from 0 to 1 (with saturated regions having value of 1 and unsaturated regions having value of 0). In order to detect saturated regions, low exposure frames can be employed, and a thresholding strategy on pixel values in these short exposure frames can be used. For example, for a three-frame stack $M_1$, $M_2$ and $M_3$ where the first two frames are long exposure frames and the third frame is a short exposure frame, the saturation map can be represented as follows.

$$\text{Saturation Map} = M_3 > T$$

Here, T is a tunable threshold.

When matching the histograms, the presence of saturated regions can adversely impact the matched results, and the first and second saturation regions removal operations 606, 608 can be performed. The saturated regions can be considered as outliers for histogram matching. Thus, to achieve better results, these regions can be discarded so that only non-saturated regions are considered for histogram matching. For an image I, the first and second saturation regions removal operations 606, 608 can be mathematically represented as follows.

$$\text{Histogram}_{no\_sat} = \text{Histogram}(I * (1 - \text{Saturation Map}))$$

Although FIG. 6 illustrates one example of a tone consistency process 600 using a saturation map, various changes may be made to FIG. 6. For example, various components and functions in FIG. 6 may be combined, further subdivided, replicated, or rearranged according to particular needs. Also, one or more additional components and functions may be included if needed or desired.

Figure 7:
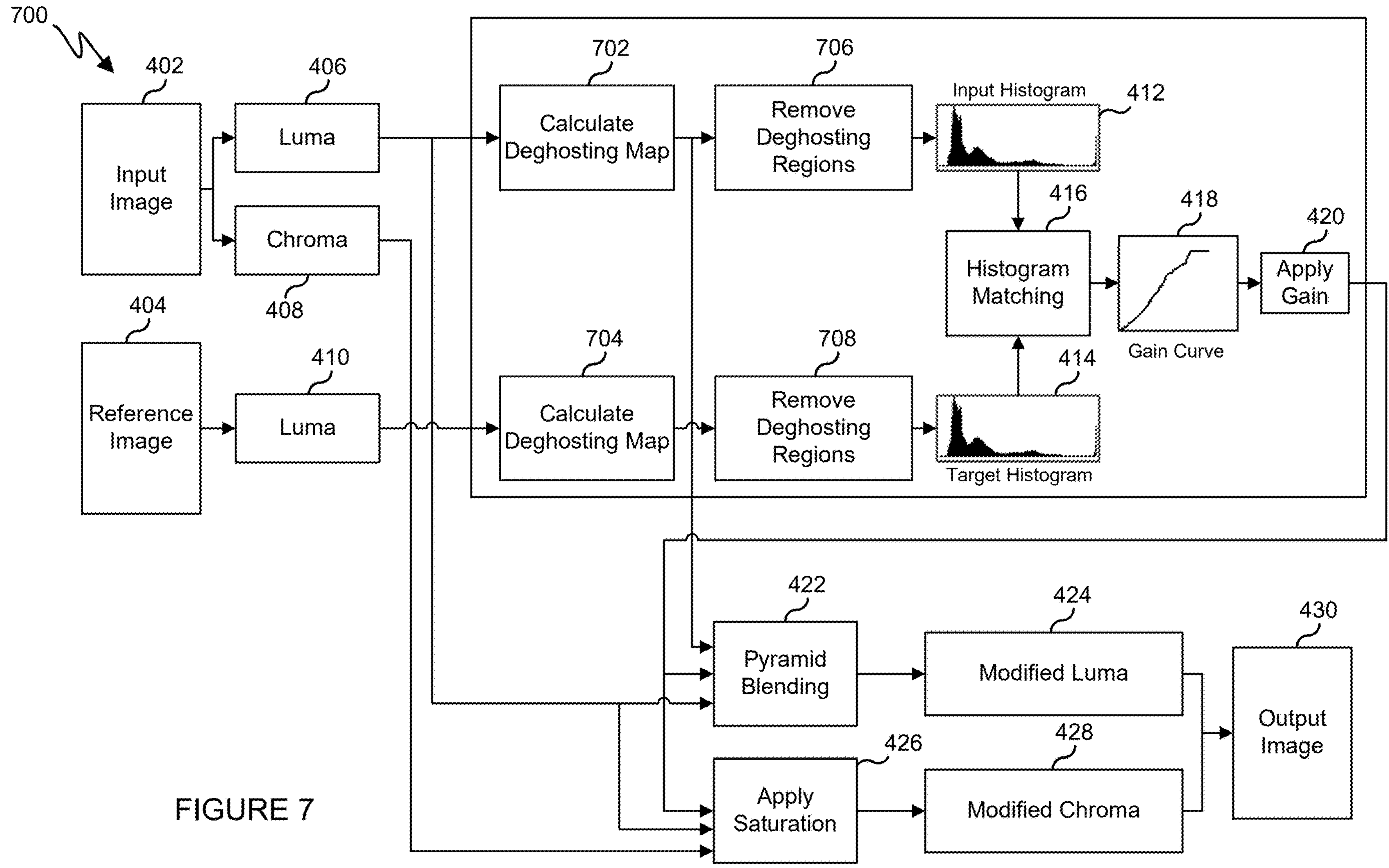
FIG. 7 illustrates an example tone consistency process using a deghosting map in accordance with this disclosure.

FIG. 7 illustrates an example tone consistency process 700 using a deghosting map in accordance with this disclosure. For ease of explanation, the process 700 is described as involving the use of the electronic device 101 in the network configuration 100 of FIG. 1. However, the process 700 may be used with any other suitable electronic device (such as the server 107) or a combination of devices (such as the electronic device 101 and the server 107) and in any other suitable system(s).

As shown in FIG. 7, the process 700 is similar to the process 400 but, instead of performing operations 411, 413, 415, and 417, a first deghosting map calculation operation 702, a second deghosting map calculation operation 704, a first deghosting regions removal operation 706, and a second deghosting regions removal operation 708 are performed. Based on the removed deghosting regions, the input histogram 412 and the target histogram 414 are generated, and the rest of the process 700 proceeds in a similar manner as the process 400 of FIG. 4.

In various embodiments, deghosting maps can be used as the consistency mask. The deghosting maps detect motion regions, and subsequently these areas are removed when matching the tone. That is, areas with motion can be different between the input image 402 and the reference image 404. Thus, it can be beneficial for these areas to not be considered during histogram matching. The first deghosting map calculation operation 702 generates a first deghosting map that is used by the first deghosting regions removal operation 706 to remove deghosting regions of the input image 402 and to output the input histogram 412. The second deghosting map calculation operation 704 generates a second deghosting map that is used by the second deghosting regions removal operation 708 to remove deghosting regions of the reference image 404 and to output the target histogram 414.

Camera pipelines can employ multi-frame processing where a burst of frames is captured successively when the camera button is pressed or image capture is otherwise initiated. This burst of frames is processed by multiple modules present in the pipeline to obtain the final image. However, there can exist some amount of motion between the frames arising due to object motion in the scene or camera motion, such as from moving or shaking hands. Each deghosting map corresponds to a mask with values ranging from 0 to 1 (with motion regions having value of 1 and non-motion regions having value of 0). In order to detect motion regions, one of the frames is considered as a reference frame and the remaining frames as non-reference frames. A difference frame can be obtained by taking an absolute difference between every reference and non-reference pair. Regions in the difference frame beyond a predetermined threshold can be flagged as motion regions. For instance, for a two-frame stack $M_1$ and $M_2$ where $M_1$ is the reference, the difference frame D and deghosting maps can be calculated as follows.

$$D = |M_1 - M_2|$$

$$\text{Deghost Map} = D > T$$

Here, Tis a tunable threshold.

When matching the histograms, motion areas can be inconsistent between the reference and input images since they can contain different types and amounts of motion. Thus, they may not be matched and can be removed from the histogram when matching. For example, for an image I, the first and second deghosting regions removal operations 706, 708 can be mathematically represented as follows.

$$\text{Histogram}_{no\_motion} = \text{Histogram}(I * (1 - \text{Deghost Map}))$$

Although FIG. 7 illustrates one example of a tone consistency process 700 using a deghosting map, various changes may be made to FIG. 7. For example, various components and functions in FIG. 7 may be combined, further subdivided, replicated, or rearranged according to particular needs. Also, one or more additional components and functions may be included if needed or desired.

Figure 8:
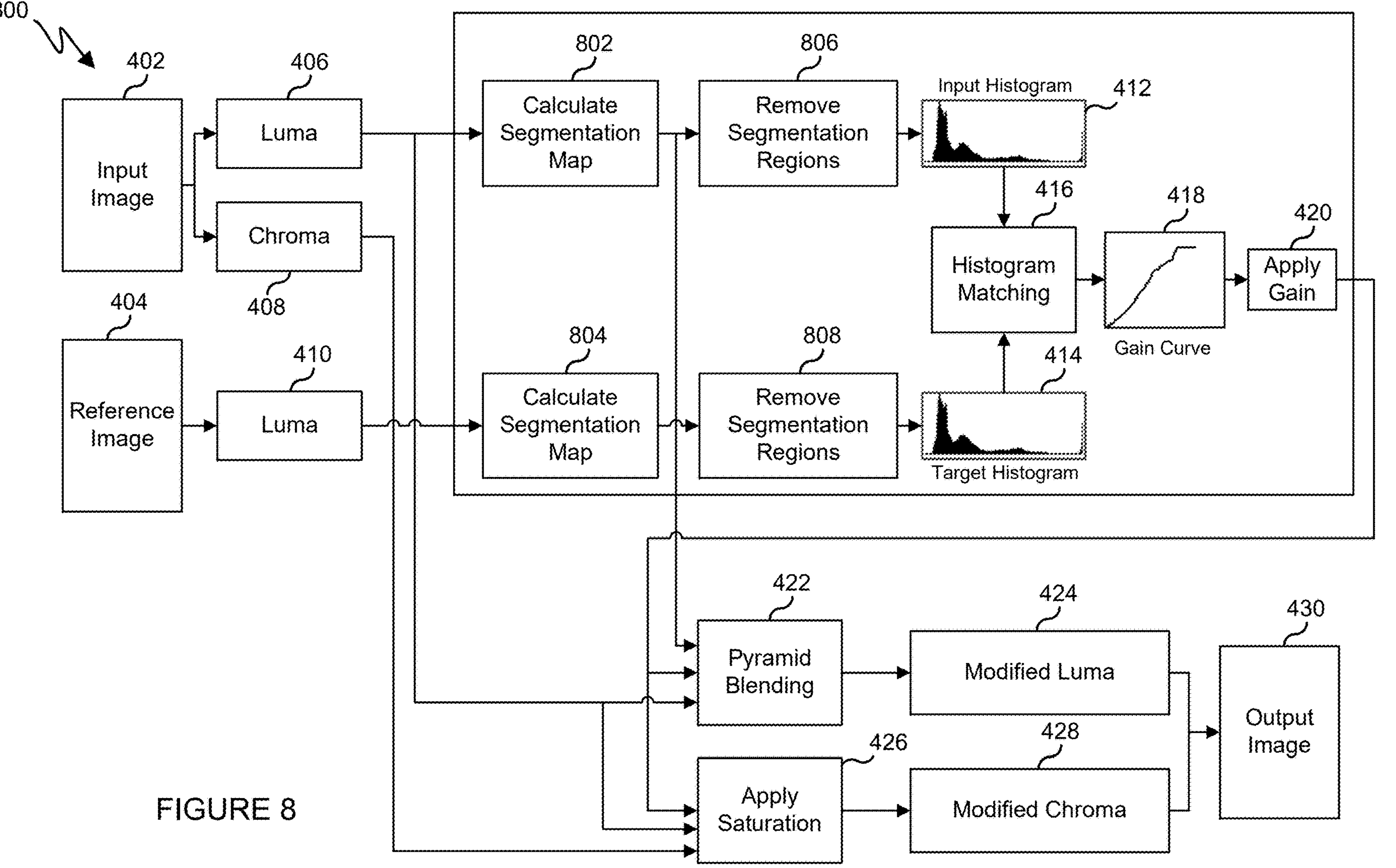
FIG. 8 illustrates an example tone consistency process using a segmentation map in accordance with this disclosure.

FIG. 8 illustrates an example tone consistency process 800 using a segmentation map in accordance with this disclosure. For ease of explanation, the process 800 is described as involving the use of the electronic device 101 in the network configuration 100 of FIG. 1. However, the process 800 may be used with any other suitable electronic device (such as the server 106) or a combination of devices (such as the electronic device 101 and the server 106) and in any other suitable system(s).

As shown in FIG. 8, the process 800 is similar to the process 400 but, instead of performing operations 411, 413, 415, and 417, a first segmentation map calculation operation 802, a second segmentation map calculation operation 804, a first segmentation regions removal operation 806, and a second segmentation regions removal operation 808 are performed. Based on the removed segmentation regions, the input histogram 412 and the target histogram 414 are generated, and the rest of the process 800 proceeds in a similar manner as the process 400 of FIG. 4.

In various embodiments, segmentation maps can be used as the consistency mask. The segmentation maps detect certain regions of interest (ROI) in a given image. Example ROI can be faces, animals, trees, etc., where the original tone present in the given input image is interested in being preserved. The first segmentation map calculation operation 802 generates a first segmentation map that is used by the first segmentation regions removal operation 806 to remove ROI regions of the input image 402 and to output the input histogram 412. The second segmentation map calculation operation 804 generates a second segmentation map that is used by the second segmentation regions removal operation 808 to remove ROI regions of the reference image 404 and to output the target histogram 414. In this way, when matching the histograms, ROI tones may not be altered. Thus, the ROI tones may not be matched and may be removed from the histogram prior to performing the histogram matching operation 416.

In some embodiments, detecting regions of interest to produce the segmentation maps by the operations 802, 804 can be performed as is described in He et al., "Mask R-CNN," IEEE Transactions on Pattern Analysis and Machine Intelligence, Vol. 42, Issue 2, February 2020, pg. 386-397 (which is here incorporated by reference in its entirety). In other embodiments, detecting regions of interest to produce the segmentation maps by the operations 802, 804 can be performed as is described in Long et al., "Fully Convolutional Networks for Semantic Segmentation," IEEE Transactions on Pattern Analysis and Machine Intelligence, Vol. 39, Issue 4, April 2017, pg. 640-651 (which is here incorporated by reference in its entirety). For an image I, the first and second segmentation regions removal operations 806, 808 can be mathematically represented as follows.

$$\text{Histogram}_{no\_faces} = \text{Histogram}(I * (1 - \text{Segmentation Map}))$$

Although FIG. 8 illustrates one example of a tone consistency process 800 using a segmentation map, various changes may be made to FIG. 8. For example, various components and functions in FIG. 8 may be combined, further subdivided, replicated, or rearranged according to particular needs. Also, one or more additional components and functions may be included if needed or desired. In addition, it will be understood that the processes of FIGS. 4 through 8 can be combined to generate a composite consistency mask that can use multiple metrics (saturation, deghosting, segmentation, etc.) to decide which pixels are to be used for tone matching.

Figure 9:
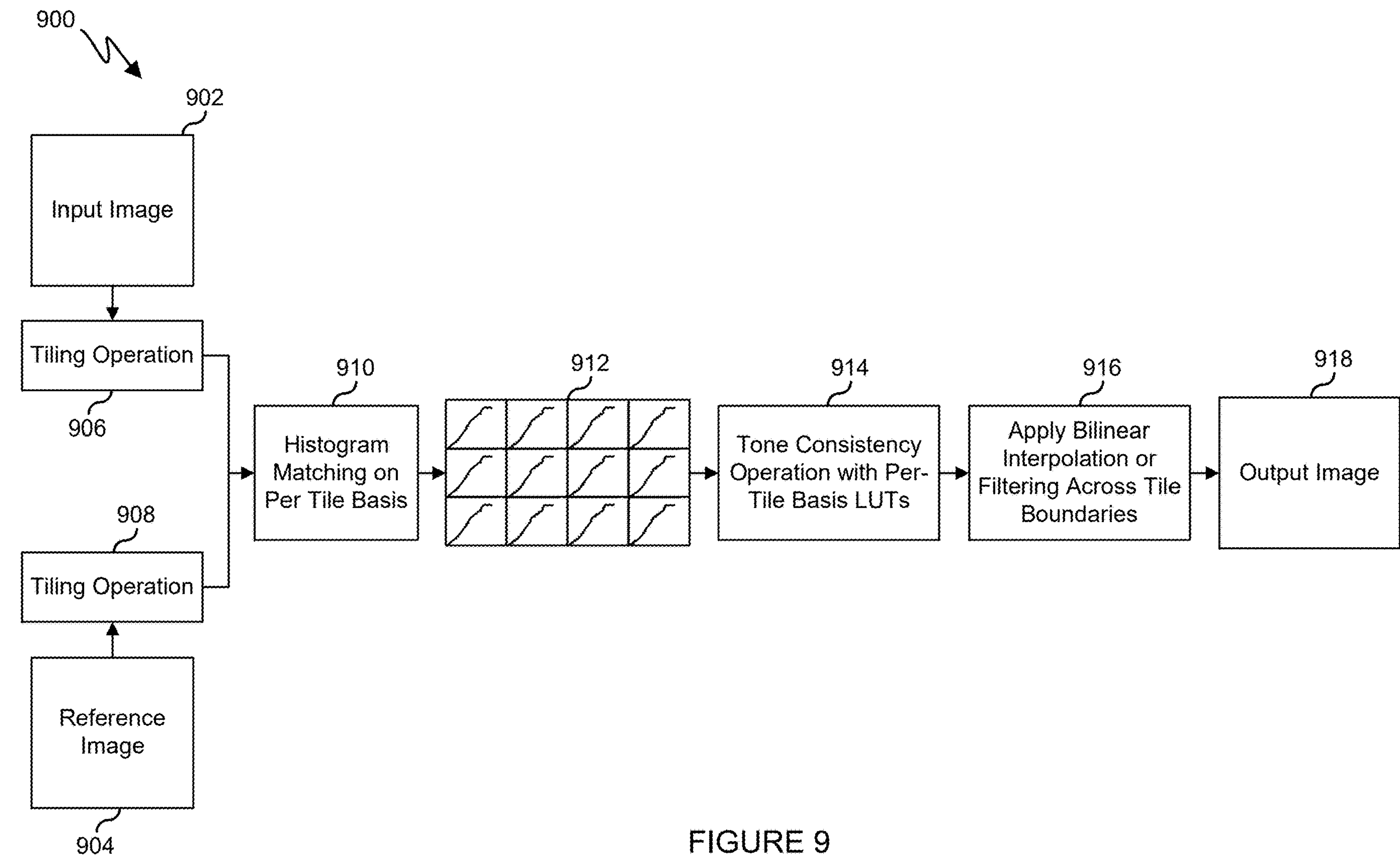
FIG. 9 illustrates an example tile-based tone consistency process in accordance with this disclosure.

FIG. 9 illustrates an example tile-based tone consistency process 900 in accordance with this disclosure. For ease of explanation, the process 900 is described as involving the use of the electronic device 101 in the network configuration 100 of FIG. 1. However, the process 900 may be used with any other suitable electronic device (such as the server 106) or a combination of devices (such as the electronic device 101 and the server 106) and in any other suitable system(s).

As shown in FIG. 9, an input image 902 and a reference image 904 are provided. The input image 902 can be a single frame image result obtained using a multi-frame imaging pipeline of the electronic device 101, such as the single frame image result 206. The reference image 904 can be a single frame image obtained using a single frame imaging pipeline of the electronic device 101, such as the HWISP reference image 208. As described in this disclosure, the reference image 904 can correspond to a preview image presented on a screen of the electronic device 101 prior to image capture.

The input image 902 is separated into tiles at a first tiling operation 906, and the reference image 904 is separated into tiles at a second tiling operation 908. A histogram matching operation 910 can be performed to match histograms created for each tile of the input image 902 and the reference image 904 on a per tile basis to provide a plurality of gain curves 912. A tone consistency operation 914, which can be the tone consistency operation 210, can be performed with the per-tile basis LUTs (gain curves 912). The tone consistency operation 914 can be applied using a global approach (such as described with respect to FIG. 3) or both a local and global approach using generated consistency masks (such as described with respect to FIGS. 4 through 8) where, for each tile, a consistency mask is used to determine which pixels to use and which pixels to not use in matching the tone locally between tiles. The matched tiles can be combined, such as by applying an interpolation or filtering operation 916 across tile boundaries, to produce the final tone-matched output image 918.

Although FIG. 9 illustrates one example of a tile-based tone consistency process 900, various changes may be made to FIG. 9. For example, various components and functions in FIG. 9 may be combined, further subdivided, replicated, or rearranged according to particular needs. Also, one or more additional components and functions may be included if needed or desired.

Figure 10:
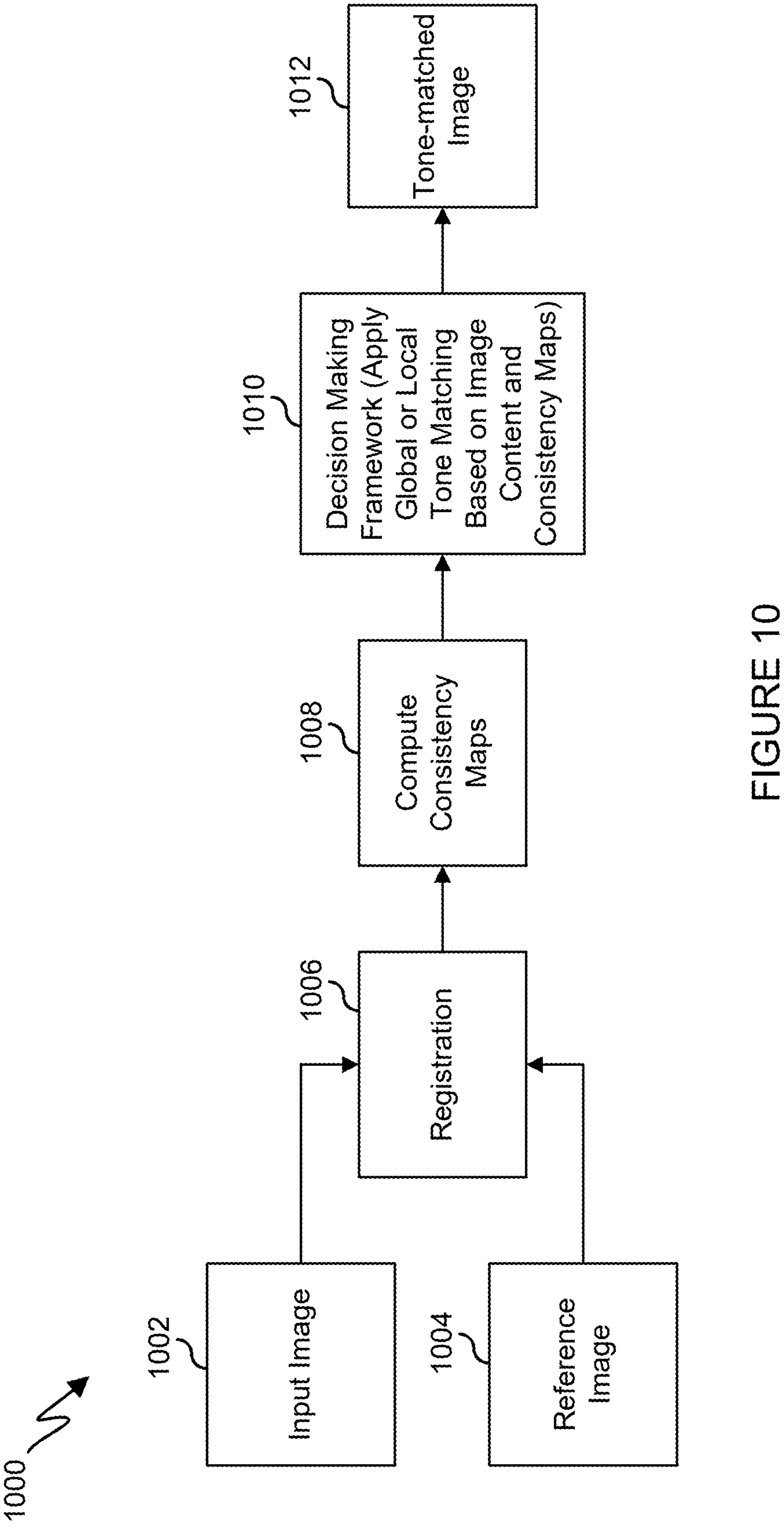
FIG. 10 illustrates an example tone mapping type selection process in accordance with this disclosure.

FIG. 10 illustrates an example tone mapping type selection process 1000 in accordance with this disclosure. For ease of explanation, the process 1000 is described as involving the use of the electronic device 101 in the network configuration 100 of FIG. 1. However, the process 1000 may be used with any other suitable electronic device (such as the server 106) or a combination of devices (such as the electronic device 101 and the server 106) and in any other suitable system(s).

The process 1000 can be used to determine which of the various embodiments of the tone consistency operation 210 can be used, such as whether to use a global tone consistency operation such as described with respect to FIG. 3, a combined local and global tone consistency operation such as described with respect to FIG. 4 (and which type of consistency mask to use (such as saturation map, deghosting map, and/or segmentation map) such as described with respect to FIGS. 6 through 8), or a local/tile-based approach such as described with respect to FIG. 9.

As shown in FIG. 10, an input image 1002 and a reference image 1004 are provided. The input image 1002 can be a single frame image result obtained using a multi-frame imaging pipeline of the electronic device 101, such as the single frame image result 206. The reference image 1004 can be a single frame image obtained using a single frame imaging pipeline of the electronic device 101, such as the HWISP reference image 208. As described in this disclosure, the reference image 1004 can correspond to a preview image presented on a screen of the electronic device 101 prior to image capture.

A registration operation 1006 can be performed to register and store the input image 1002 and the reference image 1004. At block 1008, consistency maps can be generated. A decision-making operation 1010 can be performed to determine the type of tone consistency to apply using features computed from the input image 1002 and the reference image 1004. For example, operation 1010 can determine whether to apply global or local tone matching based on the image content and the consistency maps. In some cases, operation 1010 can involve selecting local tone-matching unless there are undesirable circumstances such as too much local motion between the input image 1002 and the reference image 1004, too much saturation in the reference image 1004, or too many FOI regions such as regions with a large number of human skin pixels, etc. As but one example, this decision making in operation 1010 could be represented as follows.

```
Global_Embodiment_Flag = False
Total_discrepancy = 0
For each tile i
  compute average value m_i of the motion map
  compute discrepancy map d_i = m_i / tile_size
  If d_i > discrepancy_threshold
      Total_Discrepancy ++
  End If
End For
If Total_Discrepancy > Total_Discrepancy_Threshold
      Global_Embodiment_Flag = True;
End If
Total_Discrepancy = 0
For each tile i
  compute average value s_i of the saturation map
  compute discrepancy map d_i = s_i / tile_size
  If d_i > discrepancy_threshold
      Total_Discrepancy ++
  End If
End For
If Total_Discrepancy > Total_Discrepancy_Threshold
    Global_Embodiment_Flag = True;
End If
Total_Discrepancy = 0
For each tile i
  compute average value f_i of the face pixel map
  compute discrepancy map d_i = f_i / tile_size
  If d_i > discrepancy_threshold
      Total_Discrepancy ++
  End If
End For
If Total_Discrepancy > Total_Discrepancy_Threshold
    Global_Embodiment_Flag = True;
End If
If Global_Embodiment == True
  Run Global or Consistency Mask Tone Matching (with global tone
  matching)
Else
  Run Tile-Based Tone Matching (with local features)
End
```

Based on the decision-making operation 1010, a tone-matched image 1012 can be output by the process 1000.

Although FIG. 10 illustrates one example of a tone mapping type selection process 1000, various changes may be made to FIG. 10. For example, various components and functions in FIG. 10 may be combined, further subdivided, replicated, or rearranged according to particular needs. Also, one or more additional components and functions may be included if needed or desired.

Figure 11:
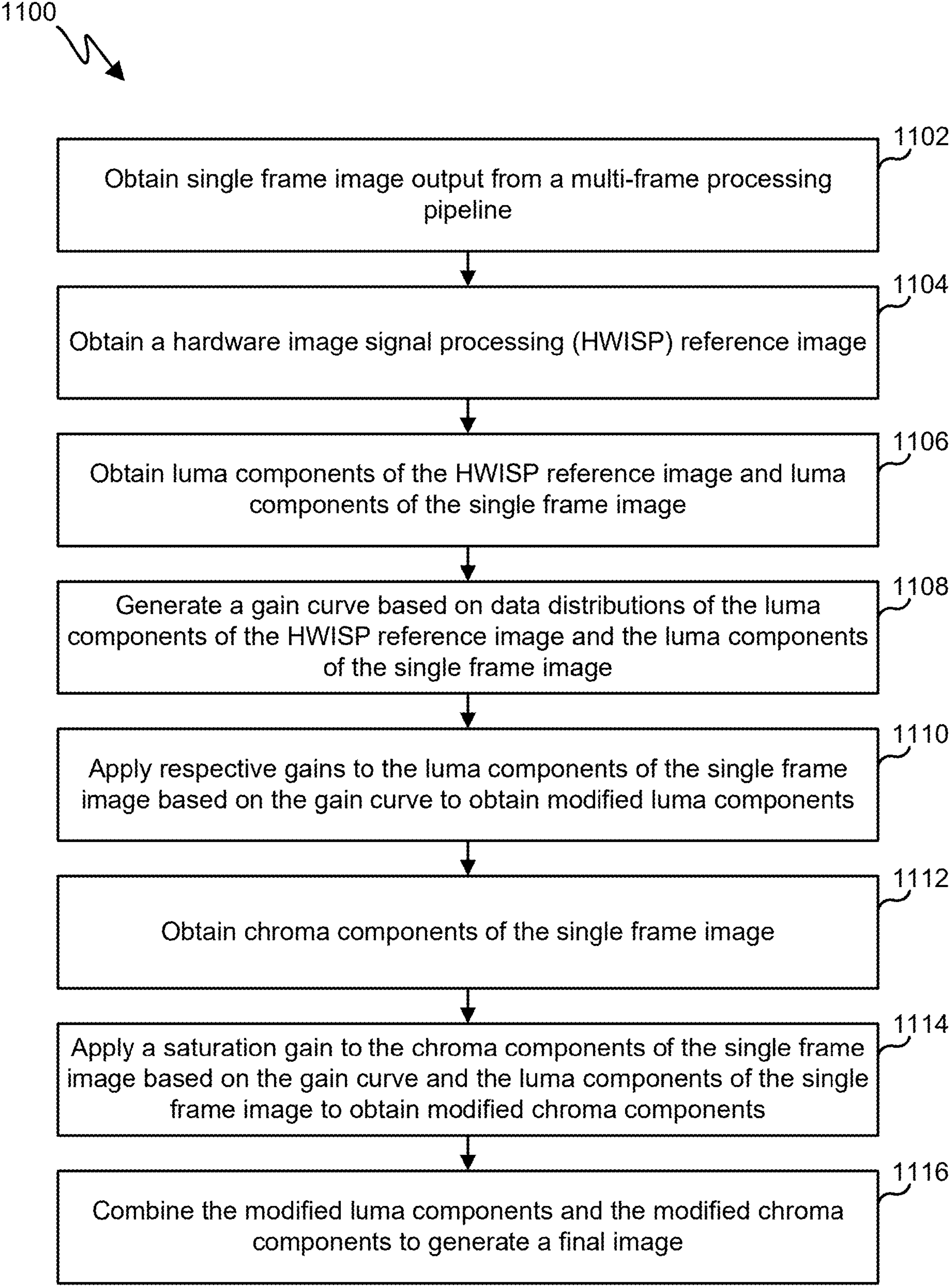
FIG. 11 illustrates an example image tone consistency method in accordance with this disclosure.

FIG. 11 illustrates an example image tone consistency method 1100 in accordance with this disclosure. For ease of explanation, the method 1100 shown in FIG. 11 is described as being performed using the electronic device 101 in the network configuration 100 of FIG. 1. However, the method 1100 could be performed using any other suitable device(s), such as the server 106, and in any other suitable system(s).

At step 1102, a single frame image is obtained from a multi-frame processing pipeline. This can include, for example, the processor 120 of the electronic device 101 using one or more cameras or other imaging sensors 180 of the electronic device 101 (along with a multi-frame processing application) to capture raw frame inputs (such as raw frame inputs 202) and to perform multi-frame processing to generate the single frame image (such as the single frame image result 206) from the raw frame inputs. In various embodiments, the single frame image can be the input image 302, 402, 902, and/or 1002.

At step 1104, an HWISP reference image is obtained. This can include, for example, the processor 120 of the electronic device 101 using one or more cameras or other imaging sensors 180 of the electronic device 101 to capture the HWISP reference image, which can be the HWISP reference image 208, such as by capturing a single frame image to be used as the reference image as a copy of a preview image presented to a user prior to capture of the multi-frame image by the user. In various embodiments, the reference image can be the reference image 304, 404, 904, and/or 1004. At step 1106, luma components of the HWISP reference image and luma components of the single frame image are obtained.

At step 1108, a gain curve is generated based on data distributions of the luma components of the HWISP reference image and the luma components of the single frame image. This can include, for example, the processor 120 performing data distribution matching on the data distributions of the luma components of the HWISP reference image and the luma components of the single frame image. In various embodiments, the data distributions of the luma components of the HWISP reference image and the luma components of the single frame image include a first histogram of the luma components of the HWISP reference image and a second histogram of the luma components of the single frame image. Step 1108 can thus include executing the histogram matching operations 316 or 416 of this disclosure to generate the gain curve, such as the gain curve 318 or 418.

At step 1110, respective gains to the luma components of the single frame image are applied based on the gain curve to obtain modified luma components. This can include, for example, the processor 120 executing the gain application operations 328 or 420. This can also include the processor 120 executing the pyramid blending operation 422. At step 1112, chroma components of the single frame image are obtained. At step 1114, a saturation gain is applied to the chroma components of the single frame image based on the gain curve and the luma components of the single frame image to obtain modified chroma components. This can include, for example, the processor 120 executing the saturation application operation 332 or 426. At step 1116, the modified luma components and the modified chroma components are combined to generate a final image, which can be the output image 212, 336, 430, 918, and/or 1012.

In various embodiments, prior to applying the gain curve to obtain the modified luma components at step 1110, the method 1100 can include generating a refined gain curve based on the gain curve and information indicative of an over-exposedness of the HWISP reference image such that applying the respective gains to the luma components of the single frame image and applying the saturation gain to the chroma components of the single frame image are based on the refined gain curve. In various embodiments, the information indicative of the over-exposedness of the HWISP reference image is an over-exposedness metric obtained based on a cumulative distribution function of the luma components of the HWISP reference image. Also, in various embodiments, generating the refined gain curve can include computing fitting weights using the information indicative of the over-exposedness of the HWISP reference image and refining the gain curve using the fitting weights and by minimizing a cost function. This can include, for example, the processor 120 executing the over-exposedness metric computation operation 320, the fitting weights computation operation 322, and the regularized gain curve refinement operation 324 as described with respect to FIG. 3.

In various embodiments, the method 1100 can include generating consistency masks based on the luma components of the HWISP reference image and the luma components of the single frame image, determining (based on the consistency masks) regions of the HWISP reference image and the single frame image to be removed from use in generating the data distributions, and removing the determined regions of the HWISP reference image and the single frame image. Also, in various embodiments, applying the respective gains to the luma components of the single frame image includes performing a blending of intensity values. Further, in various embodiments, the consistency masks are one or more of pixel-saturation maps used to identify the determined regions for removal based on pixel-saturation levels of the determined regions, deghosting maps used to identify the determined regions for removal based on movement in the determined regions, or segmentation maps used to identify the determined regions for removal based on a detected regions of interest in the HWISP reference image and the single frame image. This can include, for example, the processor 120 performing operations 411-417, 602-608, 702-708, and/or 802-808, as described in FIGS. 4 through 8.

Although FIG. 11 illustrates one example of an image tone consistency method 1100, various changes may be made to FIG. 11. For example, while shown as a series of steps, various steps in FIG. 11 could overlap, occur in parallel, occur in a different order, or occur any number of times (including zero times).

It should be noted that the functions shown in FIGS. 2 through 11 or described above can be implemented in an electronic device 101, 102, 104, server 106, or other device(s) in any suitable manner. For example, in some embodiments, at least some of the functions shown in FIGS. 2 through 11 or described above can be implemented or supported using one or more software applications or other software instructions that are executed by the processor 120 of the electronic device 101, 102, 104, server 106, or other device(s). In other embodiments, at least some of the functions shown in FIGS. 2 through 11 or described above can be implemented or supported using dedicated hardware components. In general, the functions shown in FIGS. 2 through 11 or described above can be performed using any suitable hardware or any suitable combination of hardware and software/firmware instructions. Also, the functions shown in FIGS. 2 through 11 or described above can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining a single frame image from a multi-frame processing pipeline;

obtaining a hardware image signal processing (HWISP) reference image;

obtaining luma components of the HWISP reference image and luma components of the single frame image;

generating a gain curve based on data distributions of the luma components of the HWISP reference image and the luma components of the single frame image;

applying respective gains to the luma components of the single frame image based on the gain curve to obtain modified luma components;

obtaining chroma components of the single frame image;

applying a saturation gain to the chroma components of the single frame image based on the gain curve and the luma components of the single frame image to obtain modified chroma components; and combining the modified luma components and the modified chroma components to generate a final image.

2. The method of claim 1, wherein:

the data distributions of the luma components of the HWISP reference image and the luma components of the single frame image include a first histogram of the luma components of the HWISP reference image and a second histogram of the luma components of the single frame image; and generating the gain curve includes performing histogram matching on the first histogram and the second histogram.

3. The method of claim 1, further comprising generating a refined gain curve based on the gain curve and information indicative of an over-exposedness of the HWISP reference image, wherein applying the respective gains to the luma components of the single frame image and applying the saturation gain to the chroma components of the single frame image are based on the refined gain curve.

4. The method of claim 3, wherein the information indicative of the over-exposedness of the HWISP reference image is an over-exposedness metric obtained based on a cumulative distribution function of the luma components of the HWISP reference image.

5. The method of claim 3, wherein generating the refined gain curve includes:

computing fitting weights using the information indicative of the over-exposedness of the HWISP reference image; and refining the gain curve using the fitting weights and by minimizing a cost function.

6. The method of claim 1, further comprising:

generating consistency masks based on the luma components of the HWISP reference image and the luma components of the single frame image;

determining, based on the consistency masks, regions of the HWISP reference image and the single frame image to be removed from use in generating the data distributions; and removing the determined regions of the HWISP reference image and the single frame image, wherein applying the respective gains to the luma components of the single frame image includes performing a blending of intensity values.

7. The method of claim 6, wherein the consistency masks are one or more of:

pixel-saturation maps used to identify the determined regions for removal based on pixel-saturation levels of the determined regions;

deghosting maps used to identify the determined regions for removal based on movement in the determined regions; or segmentation maps used to identify the determined regions for removal based on a detected regions of interest in the HWISP reference image and the single frame image.

8. An electronic device comprising:

at least one processing device configured to:

obtain a single frame image from a multi-frame processing pipeline;

obtain a hardware image signal processing (HWISP) reference image;

obtain luma components of the HWISP reference image and luma components of the single frame image;

generate a gain curve based on data distributions of the luma components of the HWISP reference image and the luma components of the single frame image;

apply respective gains to the luma components of the single frame image based on the gain curve to obtain modified luma components;

obtain chroma components of the single frame image;

apply a saturation gain to the chroma components of the single frame image based on the gain curve and the luma components of the single frame image to obtain modified chroma components; and combine the modified luma components and the modified chroma components to generate a final image.

9. The electronic device of claim 8, wherein:

the data distributions of the luma components of the HWISP reference image and the luma components of the single frame image include a first histogram of the luma components of the HWISP reference image and a second histogram of the luma components of the single frame image; and to generate the gain curve, the at least one processing device is configured to perform histogram matching on the first histogram and the second histogram.

10. The electronic device of claim 8, wherein:

the at least one processing device is further configured to generate a refined gain curve based on the gain curve and information indicative of an over-exposedness of the HWISP reference image; and the at least one processing device is configured to apply the respective gains to the luma components of the single frame image and the saturation gain to the chroma components of the single frame image based on the refined gain curve.

11. The electronic device of claim 10, wherein the information indicative of the over-exposedness of the HWISP reference image is an over-exposedness metric obtained based on a cumulative distribution function of the luma components of the HWISP reference image.

12. The electronic device of claim 10, wherein, to generate the refined gain curve, the at least one processing device is configured to:

compute fitting weights using the information indicative of the over-exposedness of the HWISP reference image; and refine the gain curve using the fitting weights and a minimization of a cost function.

13. The electronic device of claim 8, wherein the at least one processing device is further configured to:

generate consistency masks based on the luma components of the HWISP reference image and the luma components of the single frame image;

determine, based on the consistency masks, regions of the HWISP reference image and the single frame image to be removed from use in generating the data distributions; and remove the determined regions of the HWISP reference image and the single frame image, wherein, to apply the respective gains to the luma components of the single frame image, the at least one processing device is configured to perform a blending of intensity values.

14. The electronic device of claim 13, wherein the consistency masks are one or more of:

pixel-saturation maps used to identify the determined regions for removal based on pixel-saturation levels of the determined regions;

deghosting maps used to identify the determined regions for removal based on movement in the determined regions; or segmentation maps used to identify the determined regions for removal based on a detected regions of interest in the HWISP reference image and the single frame image.

15. A non-transitory machine readable medium comprising instructions that when executed cause at least one processor of an electronic device to:

obtain a single frame image from a multi-frame processing pipeline;

obtain a hardware image signal processing (HWISP) reference image;

obtain luma components of the HWISP reference image and luma components of the single frame image;

generate a gain curve based on data distributions of the luma components of the HWISP reference image and the luma components of the single frame image;

apply respective gains to the luma components of the single frame image based on the gain curve to obtain modified luma components;

obtain chroma components of the single frame image;

apply a saturation gain to the chroma components of the single frame image based on the gain curve and the luma components of the single frame image to obtain modified chroma components; and combine the modified luma components and the modified chroma components to generate a final image.

16. The non-transitory machine readable medium of claim 15, wherein:

the data distributions of the luma components of the HWISP reference image and the luma components of the single frame image include a first histogram of the luma components of the HWISP reference image and a second histogram of the luma components of the single frame image; and the instructions that when executed cause the at least one processor to generate the gain curve comprise instructions that when executed cause the at least one processor to perform histogram matching on the first histogram and the second histogram.

17. The non-transitory machine readable medium of claim 15, further comprising instructions that when executed cause the at least one processor to generate a refined gain curve based on the gain curve and information indicative of an over-exposedness of the HWISP reference image, wherein the application of the respective gains to the luma components of the single frame image and the application of the saturation gain to the chroma components of the single frame image are based on the refined gain curve.

18. The non-transitory machine readable medium of claim 17, wherein the instructions that when executed cause the at least one processor to generate the refined gain curve comprise instructions that when executed cause the at least one processor to:

compute fitting weights using the information indicative of the over-exposedness of the HWISP reference image; and refine the gain curve using the fitting weights and a minimization of a cost function.

19. The non-transitory machine readable medium of claim 15, further comprising instructions that when executed cause the at least one processor to:

generate consistency masks based on the luma components of the HWISP reference image and the luma components of the single frame image;

determine, based on the consistency masks, regions of the HWISP reference image and the single frame image to be removed from use in generating the data distributions; and remove the determined regions of the HWISP reference image and the single frame image, wherein the instructions that when executed cause the at least one processor to apply the respective gains to the luma components of the single frame image comprise instructions that when executed cause the at least one processor to perform a blending of intensity values.

20. The non-transitory machine readable medium of claim 19, wherein the consistency masks are one or more of:

pixel-saturation maps used to identify the determined regions for removal based on pixel-saturation levels of the determined regions;

deghosting maps used to identify the determined regions for removal based on movement in the determined regions; or segmentation maps used to identify the determined regions for removal based on a detected regions of interest in the HWISP reference image and the single frame image.

* * * * *